(12) United States Patent
Takasaki et al.

(10) Patent No.: US 7,654,352 B2
(45) Date of Patent: Feb. 2, 2010

(54) ELECTRIC VEHICLE

(75) Inventors: Seiichi Takasaki, Okazaki (JP); Toshiaki Isogai, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/328,575

(22) Filed: Dec. 4, 2008

(65) Prior Publication Data
US 2009/0145676 A1    Jun. 11, 2009

(30) Foreign Application Priority Data
Dec. 5, 2007   (JP)   .............. 2007-314989

(51) Int. Cl.
*B60R 16/04*   (2006.01)
*B60K 1/04*   (2006.01)
(52) U.S. Cl. .................. 180/68.5; 180/65.1; 180/65.21; 429/9; 429/148
(58) Field of Classification Search ................ 180/65.1, 180/65.21, 65.29, 68.5; 429/9, 18, 96, 129, 429/148; B60K 1/04, 13/04; B06R 16/04
See application file for complete search history.

(56) References Cited

U.S. PATENT DOCUMENTS

| | | | | |
|---|---|---|---|---|
| 5,534,364 A | * | 7/1996 | Watanabe et al. | 429/61 |
| 5,555,950 A | * | 9/1996 | Harada et al. | 180/65.1 |
| 5,672,920 A | * | 9/1997 | Donegan et al. | 307/147 |
| 5,948,298 A | * | 9/1999 | Ijaz | 219/209 |
| 6,227,322 B1 | * | 5/2001 | Nishikawa | 180/68.5 |
| 6,451,474 B1 | * | 9/2002 | Kozu et al. | 429/100 |
| 6,541,154 B2 | * | 4/2003 | Oogami et al. | 429/159 |
| 6,598,691 B2 | * | 7/2003 | Mita et al. | 180/65.1 |
| 6,632,560 B1 | * | 10/2003 | Zhou et al. | 429/99 |
| 6,723,466 B2 | * | 4/2004 | Oogami et al. | 429/94 |
| 6,767,666 B2 | * | 7/2004 | Nemoto et al. | 429/120 |
| 7,353,900 B2 | * | 4/2008 | Abe et al. | 180/68.5 |
| 7,507,499 B2 | * | 3/2009 | Zhou et al. | 429/99 |
| 7,610,978 B2 | * | 11/2009 | Takasaki et al. | 180/68.5 |
| 2003/0118898 A1 | * | 6/2003 | Kimura et al. | 429/156 |
| 2006/0040173 A1 | * | 2/2006 | Shimamura et al. | 429/99 |
| 2006/0060402 A1 | * | 3/2006 | Abe et al. | 180/68.5 |
| 2007/0238016 A1 | * | 10/2007 | Takamatsu | 429/120 |

(Continued)

FOREIGN PATENT DOCUMENTS

JP    6-270694 A    9/1994

(Continued)

*Primary Examiner*—Lesley Morris
*Assistant Examiner*—Jacob Meyer
(74) *Attorney, Agent, or Firm*—Birch, Stewart, Kolasch & Birch, LLP

(57) ABSTRACT

A battery unit mounted in an electric vehicle is provided with a battery case and a plurality of battery modules. The battery case includes a tray member on the lower side and a cover member on the upper side. The tray member is fixed to side members by a beam member extending in a width direction of a vehicle body. Each battery module is composed of a plurality of cells. Among all the cells contained in the battery case, at least those cells on the outer peripheral side which are located near a flank of the vehicle body are located on the tray member so that a lamination direction of cell elements is coincident with the width direction of the vehicle body.

1 Claim, 10 Drawing Sheets

U.S. PATENT DOCUMENTS

| | | | |
|---|---|---|---|
| 2007/0284167 A1* | 12/2007 | Watanabe et al. | 180/68.5 |
| 2008/0173488 A1* | 7/2008 | Takasaki | 180/68.5 |
| 2008/0173489 A1* | 7/2008 | Takasaki | 180/68.5 |
| 2008/0190679 A1* | 8/2008 | Sato et al. | 180/68.5 |
| 2008/0236909 A1* | 10/2008 | Morita et al. | 180/65.1 |
| 2008/0292953 A1* | 11/2008 | Hosaka et al. | 429/163 |
| 2009/0023059 A1* | 1/2009 | Kinoshita et al. | 429/153 |
| 2009/0081551 A1* | 3/2009 | Hoshina et al. | 429/231.95 |

FOREIGN PATENT DOCUMENTS

| | | |
|---|---|---|
| JP | 2005-7915 A | 1/2005 |
| JP | 2006-40645 A | 2/2006 |
| JP | 2007-22139 A | 2/2007 |
| JP | 2007-237779 A | 9/2007 |

* cited by examiner

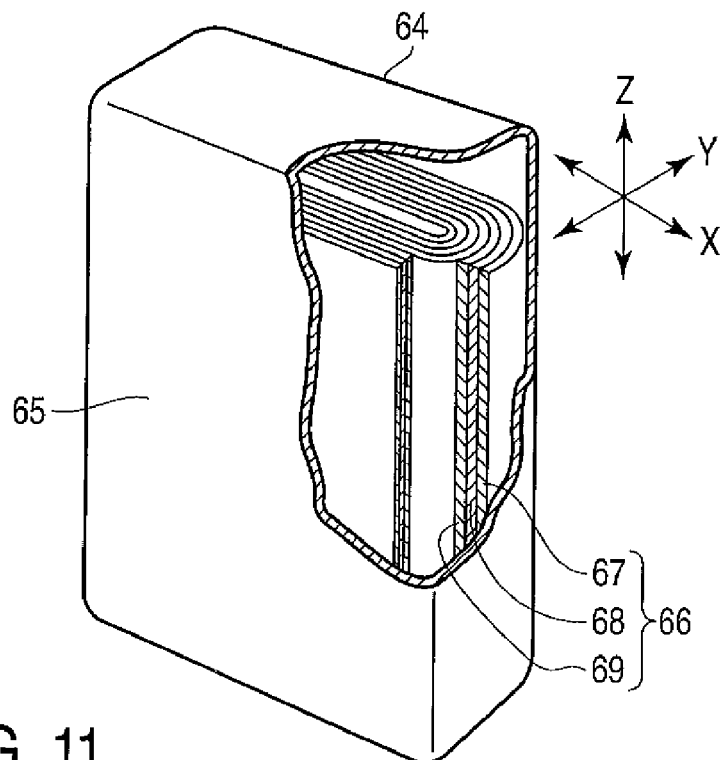
F I G. 11
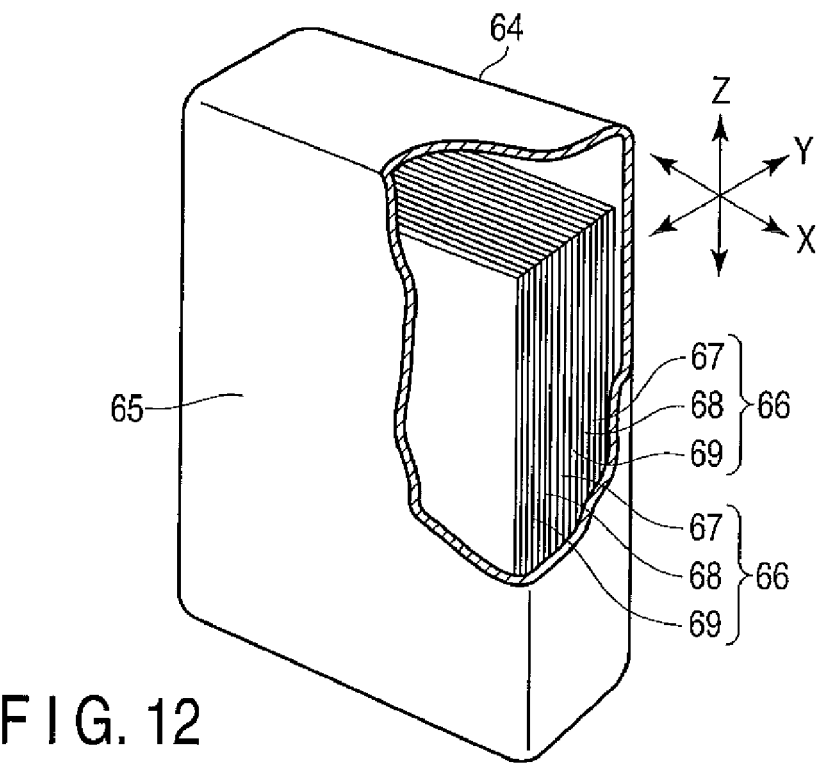
F I G. 12

ELECTRIC VEHICLE

CROSS-REFERENCE TO RELATED APPLICATIONS

This application is based upon and claims the benefit of priority from prior Japanese Patent Application No. 2007-314989, filed Dec. 5, 2007, the entire contents of which are incorporated herein by reference.

BACKGROUND OF THE INVENTION

1. Field of the Invention

The present invention relates to an electric vehicle configured to be driven by a motor using a battery unit as a power source.

2. Description of the Related Art

A battery unit used in an electric vehicle includes a battery module composed of a plurality of cells, a battery case that contains the battery module, etc. The battery case is provided with, for example, a tray member that supports the battery module, a cover member that covers the top of the tray member, etc. Cells are secondary batteries, such as lithium-ion batteries.

A structure has been made to reduce damage to a vehicle body and a battery unit in case of a collision of an electric vehicle that is provided with the battery unit. An automobile described in Jpn. Pat. Appln. KOKAI Publication No. 6-270694, for example, is configured so that a battery carrier moves to a position below the vehicle body when subjected to a frontal impact force. Collision energy can be absorbed by this configuration.

An electric vehicle is provided with a large battery unit in its body to maximize its mileage. Accordingly, the battery unit occupies a rather large area of the floor section of the vehicle body as viewed from above the body. In some cases, the large battery unit may be located covering, for example, the entire width of the vehicle body.

With respect to the longitudinal direction of the vehicle body, a relatively large crush zone can be secured ranging from the front end of the vehicle body to that of the battery unit. Further, a relatively long distance can be secured from the rear end of the battery unit to that of the vehicle body. The vehicle body structure of this type can relatively easily absorb a collision load that acts on the battery unit in case of a head-on or rear-end collision.

With respect to the width direction of the vehicle body, however, the distance from a side surface of the battery unit to that of the vehicle body is short. Accordingly, it is hard to secure a crush zone large enough to absorb energy from a collision load that is applied sideways. In case of a side collision, therefore, a collision load may act directly on the battery unit to damage the cells with higher possibility than in the case of a head-on or rear-end collision. The damaged cells are supposed to cause an internal short circuit between electrodes and heat generation with high probability.

BRIEF SUMMARY OF THE INVENTION

The object of the present invention is to provide an electric vehicle configured so that the degree of breakage of cells can be lowered against a load that is laterally applied to a vehicle body.

The present invention is an electric vehicle comprising a battery unit mounted in a vehicle body, the battery unit including a battery case fixed to the vehicle body and a battery module composed of a plurality of cells contained in the battery case, the battery case including a tray member, which supports the cells thereon, and a cover member fixed to the tray member so as to be superposed thereon, the cells each including sheet-like cell elements laminated within a shell member, at least those cells on the outer peripheral side which are located near a flank of the vehicle body, among all the cells contained in the battery case, being located on the tray member so that a lamination direction of the cell elements is coincident with a width direction of the vehicle body.

According to this arrangement, if a part of the vehicle body is deformed toward the battery unit by a collision load that is laterally applied to the vehicle body so that sidewalls of the tray member of the battery case and the like are deformed, the cells are pushed in the lamination direction of the cell elements. Even if the cells are pushed in the lamination direction, electrodes of the laminated cell elements cannot be easily short-circuited. Thus, the degrees of breakage and heat generation can be lowered.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a cut-away perspective view schematically showing a cell shown in FIG. 10; and FIG. 12 is a cut-away perspective view schematically showing another example of the cell.

DETAILED DESCRIPTION OF THE INVENTION

One embodiment of the present invention will now be described with reference to FIGS. 1 to 11.

Figure 1:
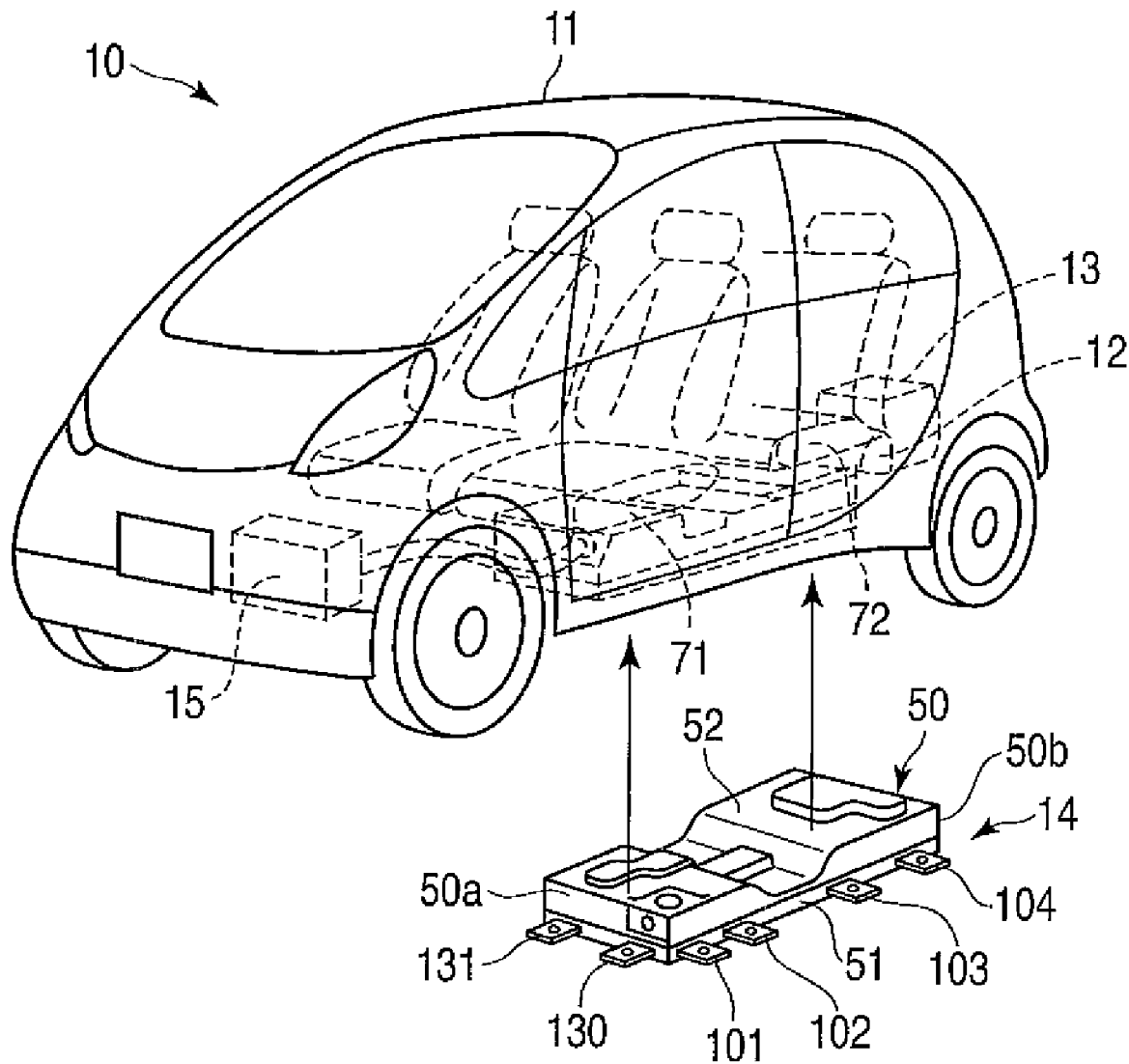
FIG. 1 is a perspective view of an electric vehicle provided with a battery unit according to one embodiment of the invention.

FIG. 1 shows an example of an electric vehicle 10. The electric vehicle 10 is provided with a traction motor 12 and a charger 13, which are located at the rear part of a vehicle body 11, a battery unit 14 under the floor of the vehicle body 11, etc. A heat exchange unit 15 for cooling and heating is disposed in the front part of the vehicle body 11.

Figure 2:
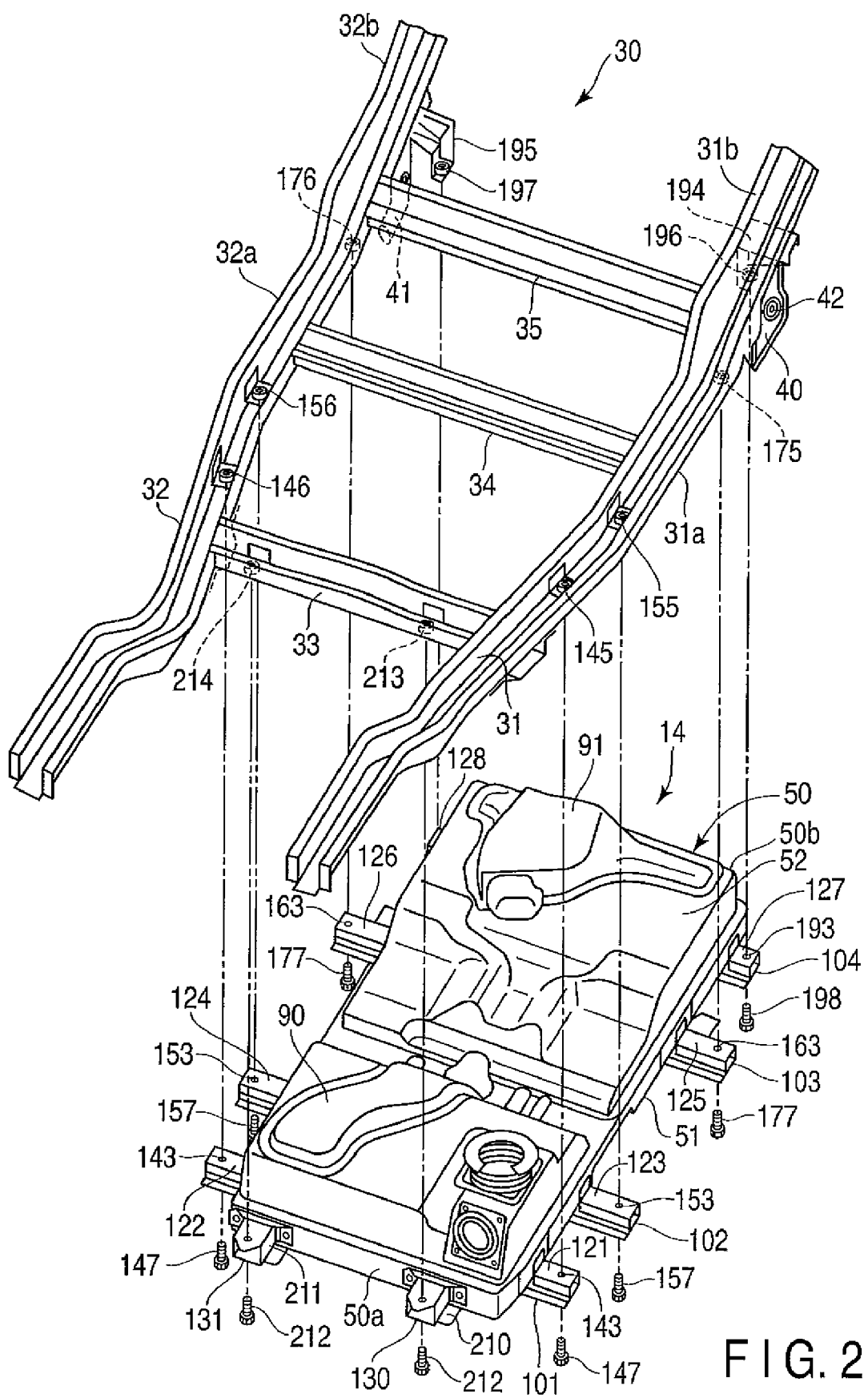
FIG. 2 is a perspective view of a frame structure and the battery unit of the electric vehicle shown in FIG. 1.

FIG. 2 shows a frame structure 30, which forms a framework of the lower part of the vehicle body 11, and the battery unit 14 to be mounted on the frame structure 30. The frame structure 30 includes a pair of side members 31 and 32 (left and right), which extend in the longitudinal direction of the vehicle body 11, and cross members 33, 34 and 35 extending in the width direction of the vehicle body 11. The cross members 33, 34 and 35 are fixed in predetermined positions on the side members 31 and 32 by welding.

Suspension arm support brackets 40 and 41 are provided on the rear parts of the side members 31 and 32, respectively. The support brackets 40 and 41 are fixed in predetermined positions on the side members 31 and 32, respectively, by welding. The support brackets 40 and 41 are provided with pivotal portions 42, individually. The front end portions of trailing arms that constitute a part of a rear suspension are mounted on the pivotal portions 42, individually.

Figure 3:
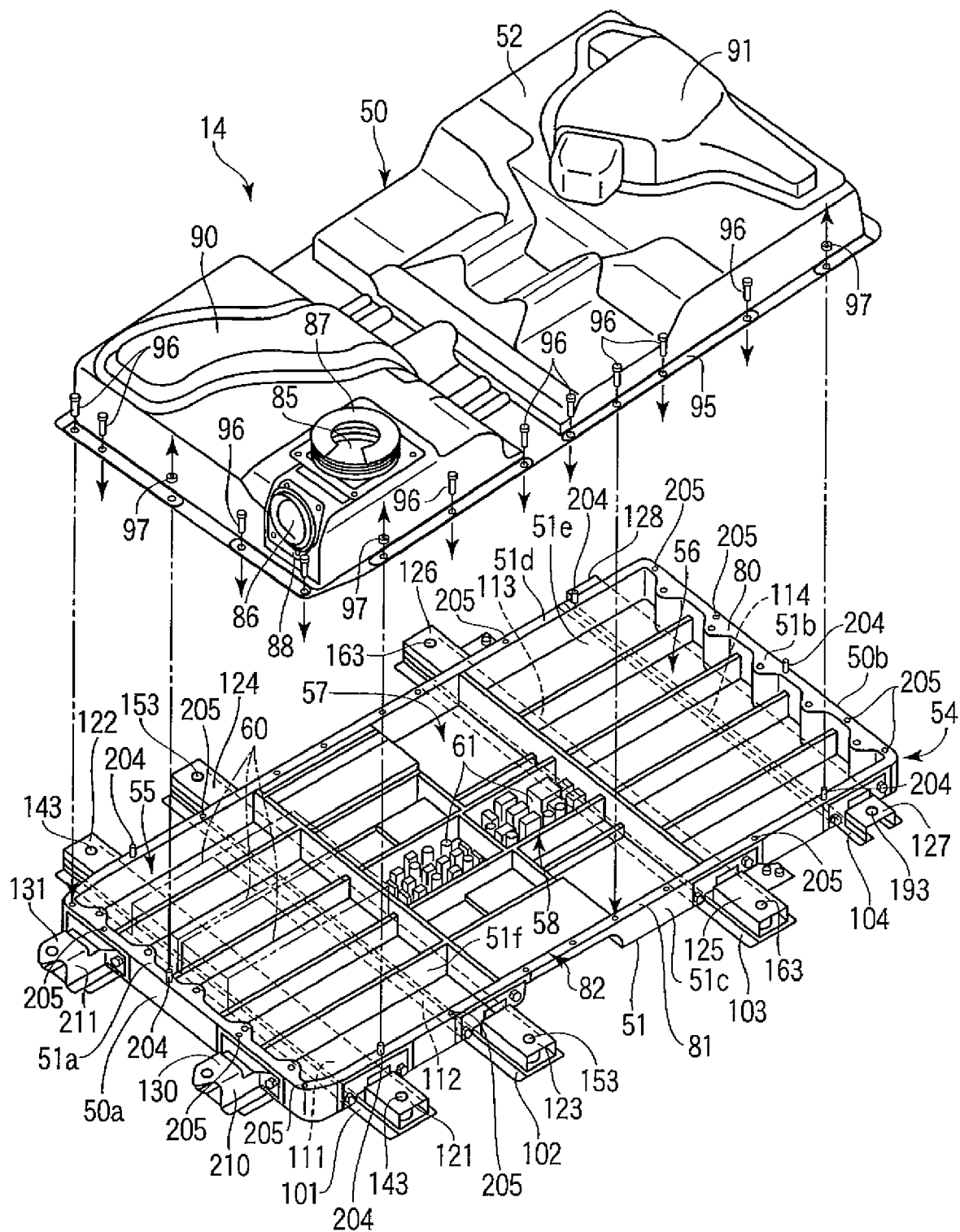
FIG. 3 is a perspective view of a tray member, a cover member, and beam members of the battery unit shown in FIG. 2.

As shown in FIG. 3, the battery unit 14 is provided with a battery case 50. The battery case 50 includes a tray member 51 situated on the lower side and a cover member 52 on the upper side.

The tray member 51 is composed of a resin portion 53 and an insert structure 200 (shown in FIGS. 6 and 7), which will be described later. The resin portion 53 is integrally molded of an electrically insulating resin. This resin is formed by reinforcing a base material of, e.g., polypropylene with short glass fibers that are several millimeters to several centimeters long.

The tray member 51 is in the form of an open-topped box, which includes a front wall 51a, a rear wall 51b, a pair of sidewalls 51c and 51d (left and right), a bottom wall 51e, and partition walls 51f and 51g. The front wall 51a is situated on the front side with respect to the longitudinal direction of the vehicle body 11. The rear wall 51b is situated on the rear side. The partition walls 51f and 51g extend longitudinally.

The sidewalls 51c and 51d of the tray member 51 are arranged along the side members 31 and 32, respectively. The front wall 51a, rear wall 51b, and sidewalls 51c and 51d constitute a peripheral wall 54 of the tray member 51. The peripheral wall 54, bottom wall 51e, and partition walls 51f and 51g are molded integrally with one another. The insert structure 200 is provided in a predetermined position on the resin portion 53 of the tray member 51.

A front battery storage section 55 is formed at the front-half portion of the battery case 50. A rear battery storage section 56 is formed at the rear-half portion of the battery case 50. A central battery storage section 57, an electric circuit storage section 58, etc., are formed between the front and rear battery storage sections 55 and 56.

Figure 6:
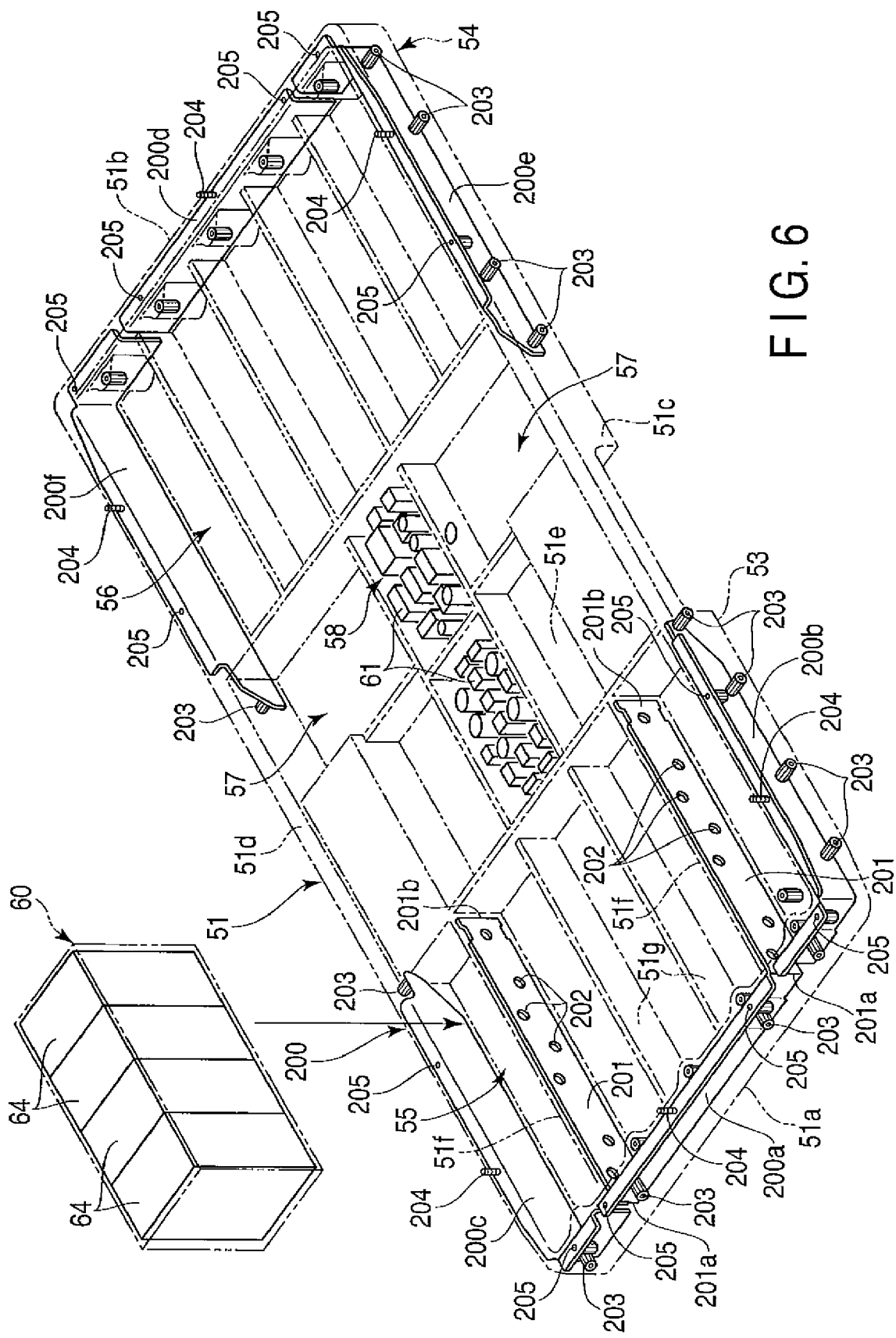
FIG. 6 is a perspective view showing a tray member of the battery unit and one of battery modules.

A battery module 60 (shown in FIGS. 6, 9 and 10) is contained in each of the battery storage sections 55, 56 and 57. The battery modules 60 are arranged on the bottom wall 51e of the tray member 51. The electric circuit storage section 58 contains monitors for detecting the states of the battery modules 60, electrical components 61 (some of which are schematically shown in FIGS. 3 and 6) for control, etc. The electrical components 61 are electrically connected to the battery modules 60.

Each battery module 60 is constructed by connecting a plurality of cells 64 in series with one another. As schematically shown in FIG. 11, each cell 64 is composed of a shell member 65 of, for example, a metal, a sheet-like cell element 66, an electrolyte, etc. The shell member 65 is also called a shell can. The shell member 65 has a flat square shape. The cell element 66 is contained in the shell member 65. The shell member 65 is filled inside with the electrolyte. An example of the cell 64 is a non-aqueous electrolyte battery, such as a lithium-ion secondary battery. Further, the shell member 65 may be made of a synthetic resin in place of a metal.

Each cell element 66 is composed of a sheet-like positive electrode 67, a sheet-like separator 68, a sheet-like negative electrode 69, etc. The separator 68 is formed of an electrically insulating material. Each cell 64 with the rolled cell element 66 is constructed in such a manner that the laminated and rolled cell element 66 is contained in the shell member 65. The direction in which turns of the rolled cell element 66 overlap one another is a lamination direction of the cell element 66. The width and thickness directions of the cell 64 indicated by arrows X and Y, respectively, in FIG. 11 are coincident with the lamination direction. On the other hand, the longitudinal direction of the cell 64 indicated by arrow Z is a direction (referred to as a surface direction herein) along the lamination plane of the cell element 66.

Figure 9:
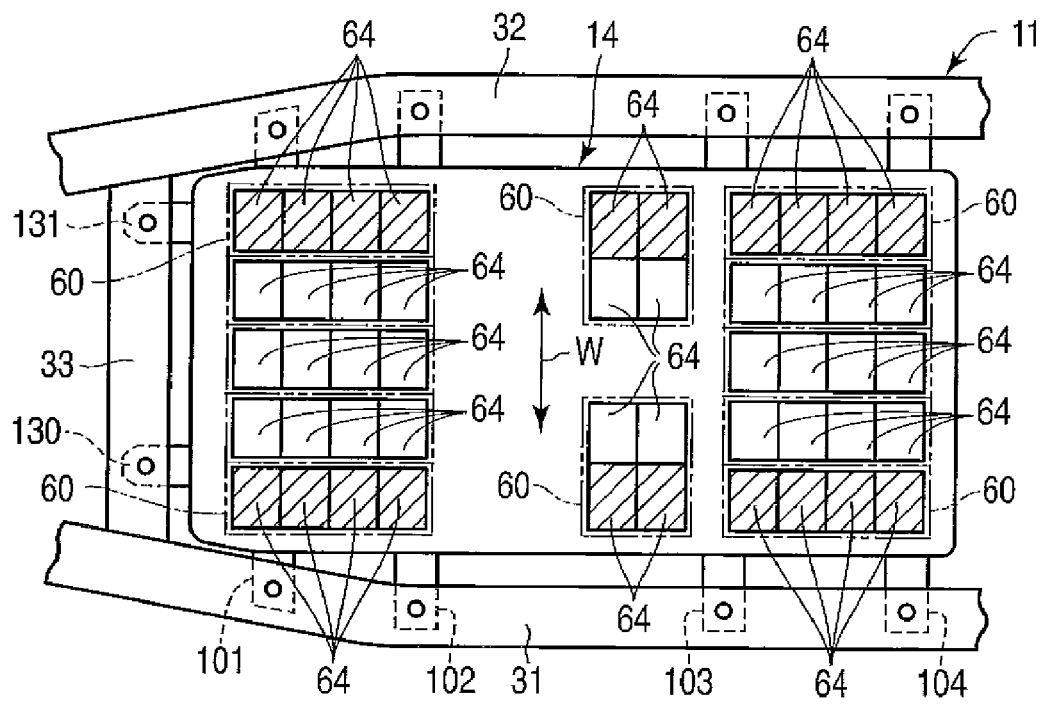
FIG. 9 is a plan view schematically showing the battery unit shown in FIG. 3.
Figure 10:
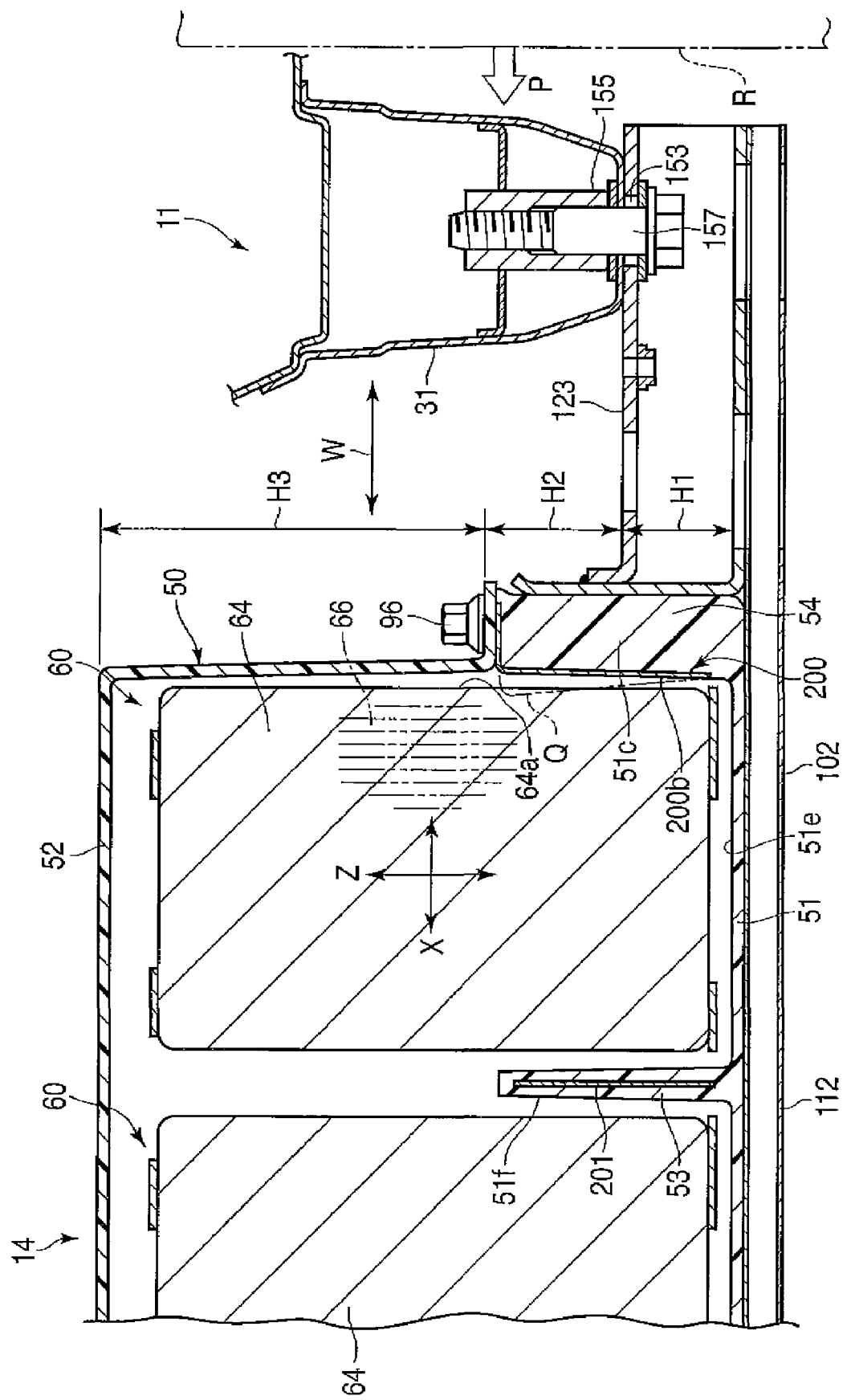
FIG. 10 is a sectional view showing a part of the battery unit and a part of a vehicle body taken along line F10-F10 of FIG. 5.

Out of all the cells 64 that are contained in the battery case 50, the cells 64 on the outer peripheral side indicated by hatching in FIG. 9 are arranged near a flank of the vehicle body, that is, near the region inside the side members 31 and 32. At least these cells 64 on the outer peripheral side, two of which are representatively shown in FIG. 10, are put on the tray member 51 so that the lamination direction (e.g., X-direction) of the cell elements 66 is coincident with the width direction W of the vehicle body 11. Further, the upper end of the sidewall 51c of the tray member 51 is opposed to a side surface portion 64a of each cell 64 between the upper and lower ends thereof. Depending on the shape of the cover member 52, the mounting height of each cell 64 must be reduced. Thus, the cells 64 may be leveled so that their thickness direction (indicated by arrow Y in FIG. 11) is vertical when they are located on the tray member 51.

In places to which wall portions extending in the width direction W of the vehicle body are located nearer than to any other regions, such as both sides of each electrical component 61, the mountability of the cells 64 may be considered with priority, and the cell elements 66 need not be laminated along the width direction W of the vehicle body.

Also, the inside cells 64, like the cells 64 on the outer peripheral side, may be arranged on the tray member 51 so that the cell elements 66 are laminated in the width direction W of the vehicle body 11. Depending on the shape of the cover member 52, moreover, the inside cells 64 may be leveled so that the X- or Y-direction in which the thickness is small is vertical when they are located on the tray member 51.

FIG. 12 shows another example of the cell 64 that includes laminated cell elements 66. In the case of this cell 64, a plurality of sets of cell elements 66 laminated in the direction of arrow Y are contained in a rectangular shell member 65. Each cell element 66 is composed of a positive electrode 67, a separator 68, a negative electrode 69, etc. In the cell 64 that includes these laminated cell elements 66, the cell elements 66 are laminated only in the direction of arrow Y. Therefore, at least the cells 64 of this laminated type on the outer peripheral side are located on the tray member 51 so that their lamination direction Y is coincident with the width direction W of the vehicle body 11.

Figure 4:
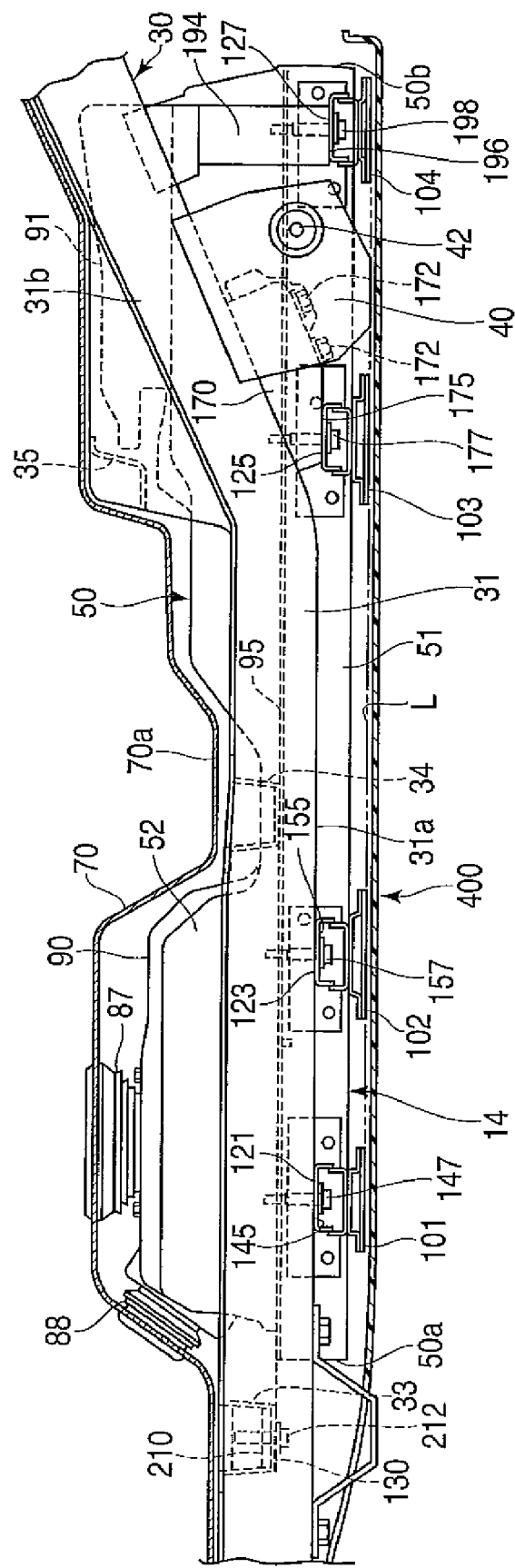
FIG. 4 is a side view of the frame structure and the battery unit of the electric vehicle shown in FIG. 1.

Since the battery unit 14 is large and heavy, as shown in FIG. 4, it is located under a floor panel 70. The floor panel 70 extends longitudinally and transversely relative to the vehicle body 11 and constitutes a floor section of the body 11. The floor panel 70 is fixed by welding in a predetermined position on the frame structure 30 that includes the side members 31 and 32.

A front seat 71 (shown in FIG. 1) and a rear seat 72 are arranged above the floor panel 70. The front battery storage section 55 of the battery unit 14 is located under the front seat 71. The rear battery storage section 56 of the battery unit 14 is located under the rear seat 72. A recessed portion 70a of the floor panel 70 is formed between the front and rear battery storage sections 55 and 56. The recessed portion 70a is situated near a space for the feet of an occupant in the rear seat 72.

A cover mounting surface 80 (shown in FIGS. 3 and 7) is formed on the peripheral edge portion of the tray member 51 of the battery case 50. The cover mounting surface 80 is continuous throughout the circumference of the tray member 51. A waterproof sealant 81 is provided on the peripheral edge portion of a junction 82 between the tray member 51 and the cover member 52.

As shown in FIG. 6, the insert structure 200 includes three insert members 200a, 200b and 200c and three insert members 200d, 200e and 200f. The insert members 200a, 200b and 200c are located at the front-half portion of the tray member 51. The insert members 200d, 200e and 200f are located at the rear-half portion of the tray member 51. These insert members 200a to 200f are press-formed products of a metal plate (e.g., steel plate).

The front insert members 200a, 200b and 200c are embedded in the front wall 51a and the sidewalls 51c and 51d, respectively, of the tray member 51. These insert members 200a, 200b and 200c reinforce the front wall 51a and the sidewalls 51c and 51d, respectively. The insert members 200d, 200e and 200f that are embedded in the rear-half portion of the tray member 51 reinforce the rear wall 51b and the sidewalls 51c and 51d, respectively, of the tray member 51.

Figure 7:
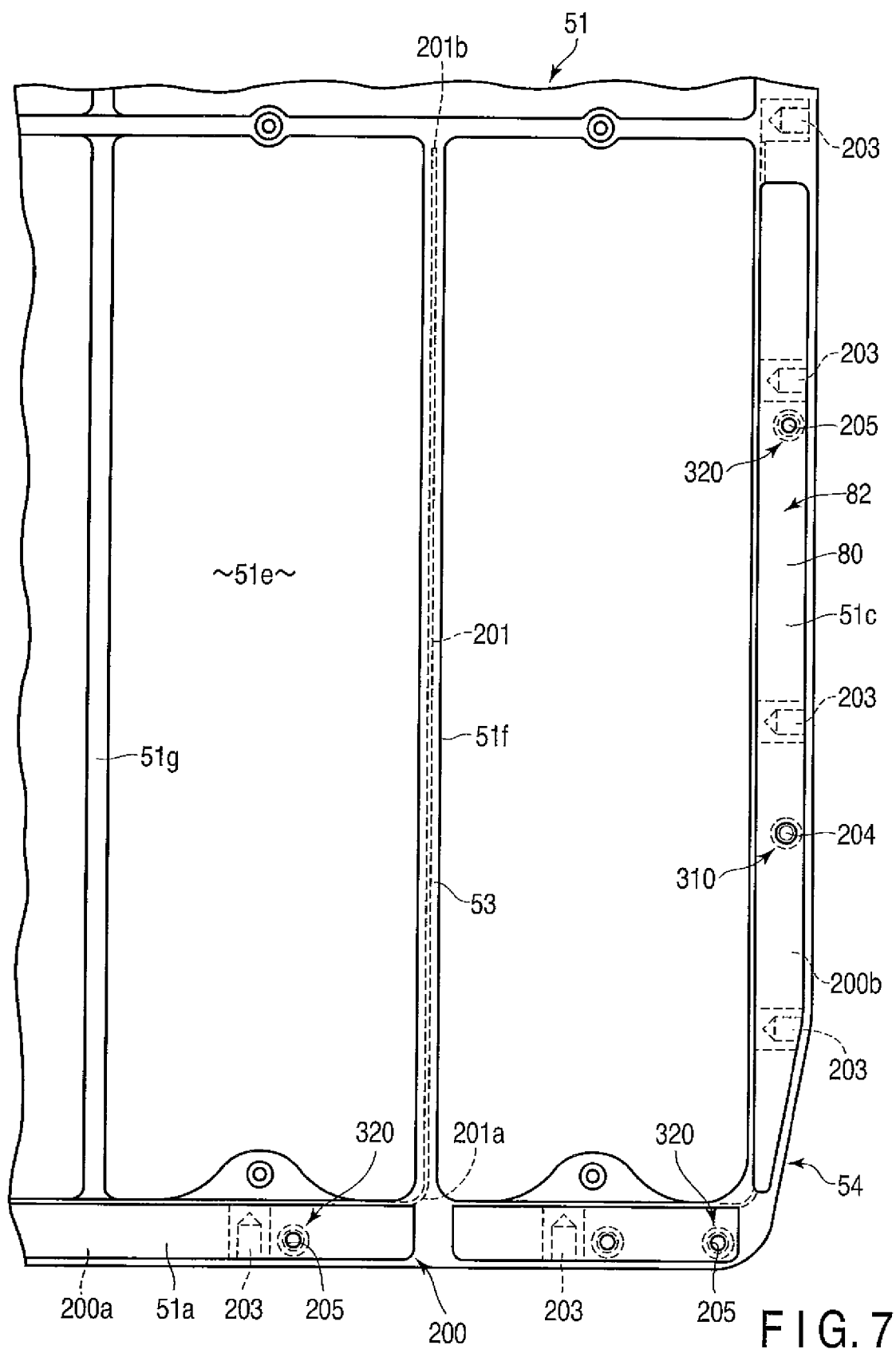
FIG. 7 is a plan view showing a part of the tray member shown in FIG. 6.

A pair of reinforcing plates 201 (left and right) are provided individually on the opposite ends of the insert member 200a that is situated in the center of the front side of the tray member 51. The reinforcing plates 201 are embedded in the partition wall 51f of the tray member 51. As shown in FIG. 7, respective front ends 201a of the reinforcing plates 201 are attached to the insert member 200a. Respective rear ends 201b of the reinforcing plates 201 extend toward the rear side of the vehicle body 11.

A plurality of holes 202 (shown in FIG. 6) are formed in each reinforcing plate 201. These holes 202 penetrate the reinforcing plate 201 along its thickness. Some of the resin of the resin portion 53 gets into each of the holes 202 and is cured. Thus, the fixing strength of the reinforcing plates 201 to the resin portion 53 can be enhanced.

As shown in FIG. 6, each of the insert members 200a to 200f is provided with horizontally extending anchor nuts 203, an upwardly projecting anchor bolt 204, and vertical anchor nuts 205. The anchor bolt 204 constitutes a first fastening portion 310 (shown in FIGS. 7 and 8).

The anchor bolt 204 has its threaded portion projecting above the cover mounting surface 80 of the tray member 51 and is fixed to a top wall 311 of the insert structure 200. Each anchor nut 205 constitutes a second fastening portion 320 (shown in FIGS. 7 and 8). The anchor nuts 205 are embedded within the cover mounting surface 80 of the tray member 51 and fixed to the top wall 311 of the insert structure 200. The anchor bolt 204 and the anchor nuts 205 are provided for each of the insert members 200a to 200f.

The cover member 52 of the battery case 50 is an integral molded product of a fiber-reinforced synthetic resin. An opening part 85 for a service plug and a cooling air inlet 86 are formed in the front part of the cover member 52. A bellows-like boot member 87 is attached to the opening part 85 for the service plug. A bellows-like boot member 88 is also attached to the cooling air inlet 86. The cover member 52 is provided in its upper surface with a bypass passage portion 90 through which some cooling air is passed, a cooling fan holder 91, etc.

A flange portion 95 is formed on the peripheral edge portion of the cover member 52. The flange portion 95 is continuous throughout the circumference of the cover member 52. The cover member 52 is put on the tray member 51. The cover mounting surface 80 of the tray member 51 and the flange portion 95 of the cover member 52 are joined together. At each first fastening portion 310, a nut member 97 is screwed onto the anchor bolt 204 from above the cover member 52 and tightened. At each second fastening portion 320, on the other hand, a bolt member 96 is screwed into each anchor nut 205 from above the cover member 52 and tightened. Thus, the tray member 51 and the cover member 52 are fixed watertight to each other with the waterproof sealant 81 between them.

Figure 5:
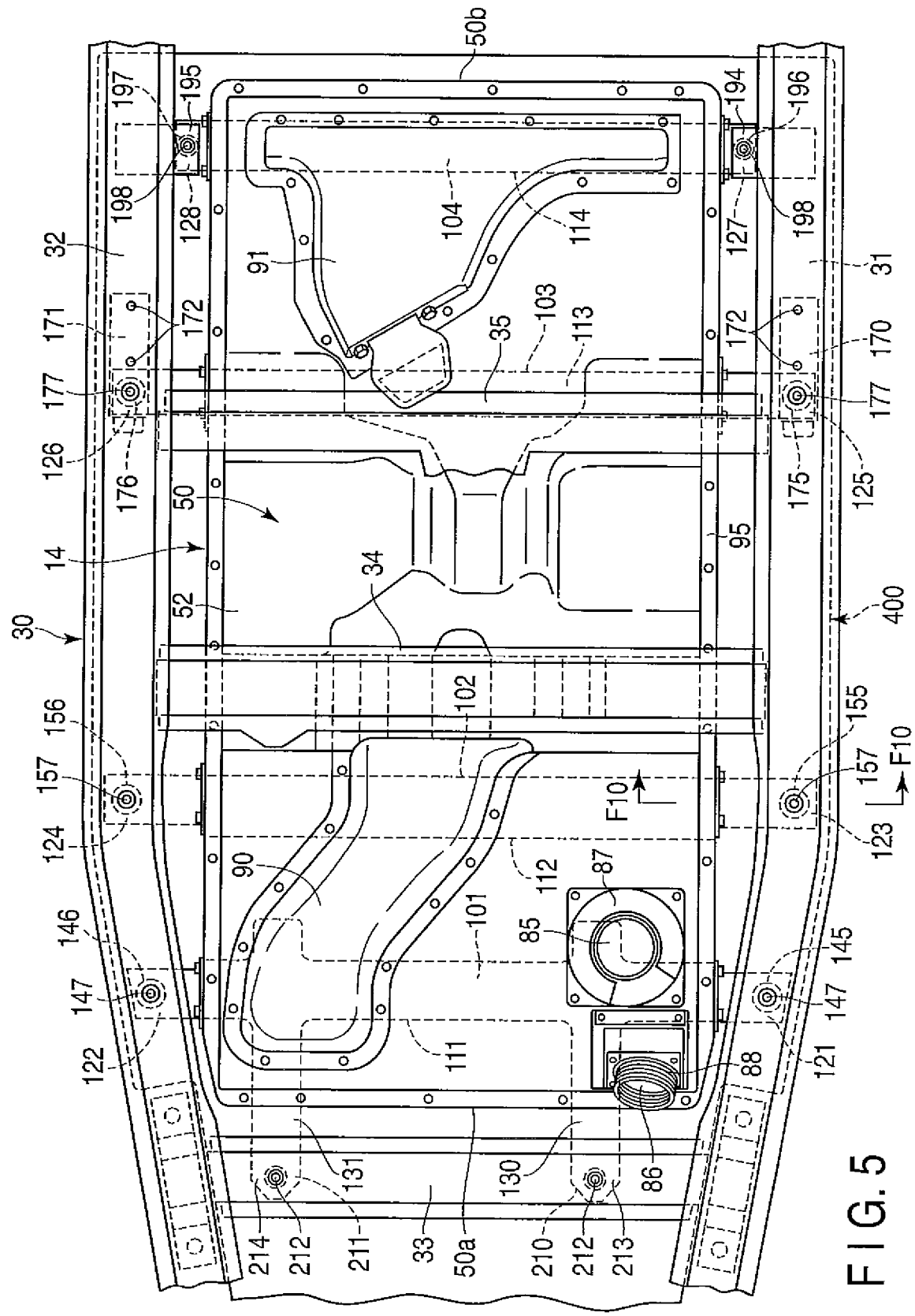
FIG. 5 is a plan view of the frame structure and the battery unit of the electric vehicle shown in FIG. 1.

A plurality of (e.g., four) beam members 101, 102, 103 and 104 are provided on the underside of the tray member 51. As shown in FIGS. 3 and 5, the beam members 101, 102, 103 and 104 include beam bodies 111, 112, 113 and 114, respectively, which extend transversely relative to the vehicle body 11. The beam members 101, 102, 103 and 104 are formed of a metallic material (e.g., steel plate) that has a sufficient strength to support the load of the battery unit 14.

Fastening portions 121 and 122 are provided individually at the opposite ends of the foremost beam body 111. Fastening portions 123 and 124 are provided individually at the opposite ends of the second foremost beam body 112. Fastening portions 125 and 126 are provided individually at the opposite ends of the third foremost beam body 113. Fastening portions 127 and 128 are provided individually at the opposite ends of the fourth foremost or rearmost beam body 114. A pair of front support members 130 and 131 (left and right) are provided on the front end portion of the battery unit 14.

A bolt insertion hole 143 (shown in FIGS. 2 and 3) vertically penetrates each of the fastening portions 121 and 122 at the opposite ends of the foremost beam member 101. Battery unit mounting portions 145 and 146 that are provided individually with nut members are located on the side members 31 and 32 opposite the fastening portions 121 and 122, respectively. Bolts 147 (shown in FIGS. 2 and 4) are inserted individually into the bolt insertion holes 143 from under the fastening portions 121 and 122. These bolts 147 are screwed individually into the nut members of the battery unit mounting portions 145 and 146 and tightened. By doing this, the fastening portions 121 and 122 of the foremost beam member 101 are fixed to the side members 31 and 32, respectively.

Figure 8:
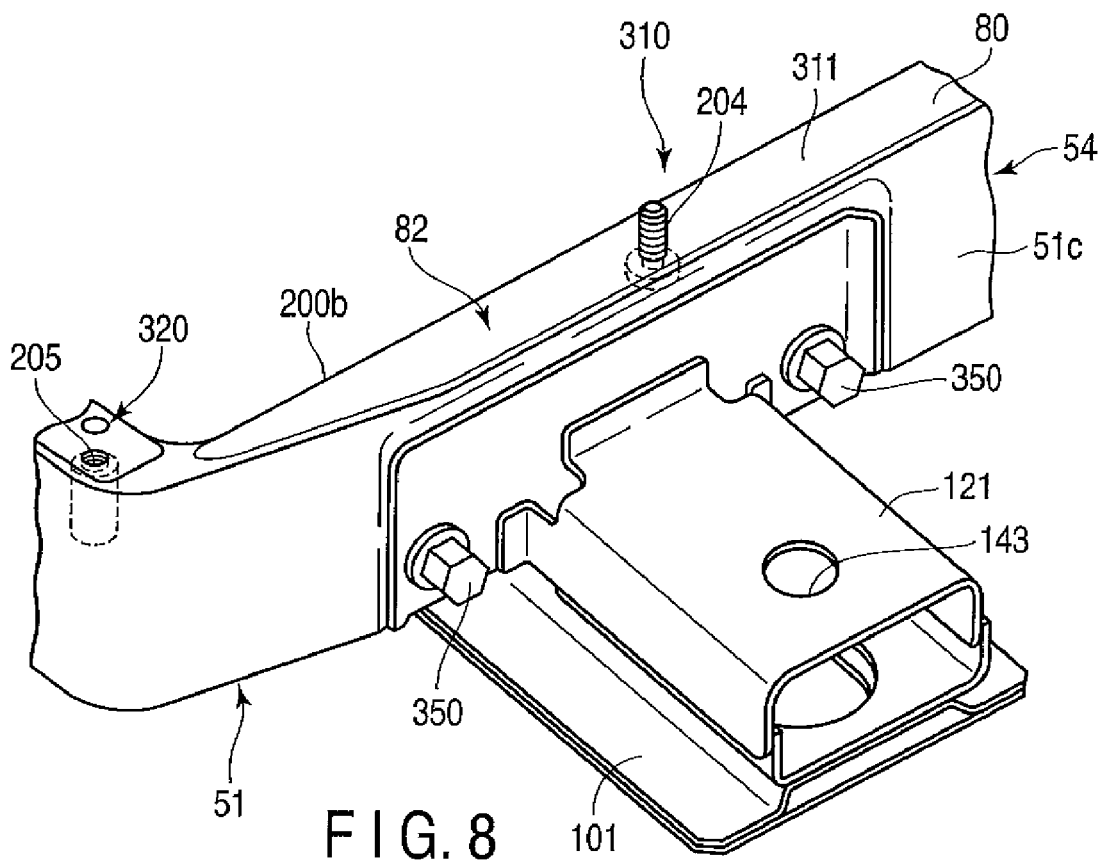
FIG. 8 is an enlarged perspective view showing a part of the tray member shown in FIG. 6 and a part of one of the beam members.

At the fastening portion 121 of the beam member 101, as shown in FIG. 8, horizontally extending bolts 350 are screwed into the anchor nuts 203 (shown in FIG. 6), individually. By doing this, the beam member 101 is fixed to the tray member 51. The other fastening portions 122 to 128 are constructed in the same manner as the fastening portion 121.

A bolt insertion hole 153 (shown in FIGS. 2 and 3) vertically penetrates each of the fastening portions 123 and 124 at the opposite ends of the second foremost beam member 102. Battery unit mounting portions 155 and 156 that are provided individually with nut members are located on the side members 31 and 32 opposite the fastening portions 123 and 124, respectively. Bolts 157 (shown in FIGS. 2 and 4) are inserted individually into the bolt insertion holes 153 from under the fastening portions 123 and 124. These bolts 157 are screwed individually into the nut members of the battery unit mounting portions 155 and 156 and tightened. By doing this, the fastening portions 123 and 124 of the second foremost beam member 102 are fixed to the side members 31 and 32, respectively.

A bolt insertion hole 163 (shown in FIGS. 2 and 3) vertically penetrates each of the fastening portions 125 and 126 at the opposite ends of the third foremost beam member 103. As shown in FIGS. 4 and 5, load transmission members 170 and 171 are fixed to the side members 31 and 32, respectively, by bolts 172. These load transmission members 170 and 171 are located over the fastening portions 125 and 126, respectively, of the third foremost beam member 103. The one load transmission member 170 is welded to the one suspension arm support bracket 40. The other load transmission member 171 is welded to the other suspension arm support bracket 41.

Specifically, the load transmission members 170 and 171 are coupled to the side members 31 and 32 and the suspension arm support brackets 40 and 41, respectively. These load transmission members 170 and 171 constitute a part of the frame structure 30. The load transmission members 170 and 171 are provided with battery unit mounting portions 175 and 176 including nut members, respectively.

Bolts 177 are inserted individually into the bolt insertion holes 163 from under the fastening portions 125 and 126. These bolts 177 are screwed individually into the nut members of the battery unit mounting portions 175 and 176 and tightened. By doing this, the fastening portions 125 and 126 of the third foremost beam member 103 are fixed to the side members 31 and 32 with the aid of the load transmission members 170 and 171, respectively.

A bolt insertion hole 193 (shown in FIGS. 2 and 3) vertically penetrates each of the fastening portions 127 and 128 of the fourth foremost beam member 104. The side members 31 and 32 are provided with extension brackets 194 and 195 in positions on the side members 31 and 32 opposite the fastening portions 127 and 128, respectively. The extension brackets 194 and 195 extend below kick-up portions 31b and 32b of the side members 31 and 32, respectively. The extension brackets 194 and 195 constitute a part of the frame structure 30. The extension brackets 194 and 195 are provided with battery unit mounting portions 196 and 197 including nut members, respectively.

Bolts 198 (shown in FIGS. 2 and 4) are inserted individually into the bolt insertion holes 193 from under the fastening portions 127 and 128. These bolts 198 are screwed individually into the nut members of the battery unit mounting portions 196 and 197 of the extension brackets 194 and 195 and tightened. By doing this, the fastening portions 127 and 128 of the fourth foremost beam member 104 are fixed to the side members 31 and 32 with the aid of the extension brackets 194 and 195, respectively.

As shown in FIG. 4, the respective lower surfaces of the beam members 101, 102, 103 and 104 are situated along a flat lower surface of the tray member 51 and on one plane L that extends horizontally. The foremost and second foremost beam members 101 and 102 are fixed directly to the battery unit mounting portions 145, 146, 155 and 156. The battery unit mounting portions 145, 146, 155 and 156 are provided on respective horizontal portions 31a and 32a of their corresponding side members 31 and 32.

The third and fourth foremost beam members 103 and 104 are fixed to the battery unit mounting portions 175, 176, 196 and 197. The battery unit mounting portions 175, 176, 196 and 197 are provided under the respective kick-up portions 31b and 32b of their corresponding side members 31 and 32. Thus, the third foremost beam member 103 is fixed to the battery unit mounting portions 175 and 176 with the aid of the load transmission members 170 and 171, respectively. The fourth foremost beam member 104 is fixed to the battery unit mounting portions 196 and 197 with the aid of the extension brackets 194 and 195, respectively.

The front support members 130 and 131 that are situated at the front end of the battery unit 14 project forward from the foremost beam member 101. The front support members 130 and 131 are coupled to the beam member 101. As shown in FIG. 2, fastening portions 210 and 211 on the front support members 130 and 131 are fixed to battery unit mounting portions 213 and 214, respectively, of the cross member 33 by bolts 212, individually.

As described above, in the electric vehicle 10 of the present embodiment, the beam members 101, 102, 103 and 104 are stretched between the left and right side members 31 and 32. The side members 31 and 32 are coupled to each other by these beam members 101, 102, 103 and 104. Thus, the beam members 101, 102, 103 and 104 of the battery unit 14 can function as rigid members that are equivalent to cross members.

Further, the load transmission members 170 and 171 are fixed to the suspension arm support brackets 40 and 41, respectively. Thus, transverse loads (in the width direction W of the vehicle body 11) that are applied to the suspension arm support brackets 40 and 41 are applied to the beam member 103 through the load transmission members 170 and 171.

Even though no cross members are arranged near the suspension arm support brackets 40 and 41, therefore, regions near the support brackets 40 and 41 can be enhanced in rigidity by the beam member 103. Thus, the driving stability and ride comfort of the vehicle can be improved. In other words, a part of the large battery unit 14 can be located in a space between the support brackets 40 and 41. In consequence, the large battery unit 14 can be mounted with ease, and the mileage of the electric vehicle can be extended.

As shown in FIGS. 4 and 5, an undercover 400 is located below the battery unit 14. The upper surface of the undercover 400 is opposed to the respective lower surfaces of the beam members 101, 102, 103 and 104. An example of the material of the undercover 400 is a synthetic resin reinforced with glass fibers. This undercover 400 is fixed to at least some parts of the frame structure 30 and the beam members 101, 102, 103 and 104 by bolts (not shown) from under the vehicle body 11.

Now let us suppose that the electric vehicle 10 is struck sideways by an obstacle. FIG. 10 schematically shows a part of the vehicle body 11 and a part of the battery unit 14. If a side collision occurs, a load P from an obstacle R acts on the vehicle body 11. Thereupon, the side member 31 is deformed to absorb collision energy, and loads are also applied to the beam member 102 and the fastening portion 123. Depending on the scale of the collision, moreover, a load acts on the sidewall 51c of the tray member 51.

The sidewall 51c of the tray member 51 extends along the side member 31. Further, the tray member 51 is reinforced by the insert structure 200 as well as by the beam member 102. Since the sidewall 51c itself is thick and for other reasons, moreover, the tray member 51 is given high rigidity to resist the load P that is applied in the width direction W of the vehicle body 11 through the fastening portion 123.

Specifically, the battery case 50 has the highest rigidity at the lower part (region indicated by H1 in FIG. 10) of the sidewall 51c of the tray member 51. On the other hand, the upper part (region indicated by H2 in FIG. 10) of the sidewall 51c of the tray member 51 is lower in rigidity than the lower part of the tray member 51. A side surface (region indicated by H3) of the cover member 52 has the lowest rigidity. When subjected to the load P caused by the side collision, therefore, the sidewall 51c of the tray member 51 tends to be deformed so as to tilt toward the side surface portion 64a of the cell 64, as indicated by a two-dot chain line Q.

In the present embodiment, as mentioned before, the cells 64 on the outer peripheral side are arranged so that the lamination direction X of the cell element 66 is coincident with the width direction W of the vehicle body 11. Further, the upper end of the sidewall 51c of the tray member 51 is opposed to the side surface portion 64a of each cell 64 between the upper and lower ends thereof. Accordingly, if the sidewall 51c of the tray member 51 is deformed by a collision so that the upper part of the sidewall 51c presses the side surface portion 64a (shown in FIG. 10) of each cell 64 between its upper and lower ends, the side surface portion 64a is pushed in the lamination direction X. If the upper or lower end of the cell 64 is collapsed in the lamination direction X, the corner portions of the cell element 66 are collapsed inevitably. Thus, the electrodes may be short-circuited at the upper or lower end of the cell 64 with higher possibility than in the case where the side surface portion 64a is pushed.

In the present embodiment, however, the upper part of the sidewall 51c of the tray member 51 can press the side surface portion 64a of the cell 64 between its upper and lower ends in the lamination direction X of the cell element 66. Even if the side surface portion 64a of the cell 64 is collapsed by the sidewall 51c of the tray member 51 that is deformed by a side collision, therefore, a breakdown such that the electrodes in the cell 64 are short-circuited cannot easily occur.

If the cell 64 is collapsed in the surface direction Z of the cell element 66, the positive and negative electrodes 67 and 69 within the cell 64 are buckled. Possibly, therefore, the electrodes may be short-circuited to cause heat generation and smoke emission. However, the cells 64 of the present embodiment are located on the tray member 51 so that the surface direction Z of the cell elements 66 is vertical. Thus, the load P caused by a side collision can be prevented from acting in the surface direction Z of the cell elements 66. In consequence, heat generation and smoke emission that are attributable to a short circuit can be prevented effectively.

In the present embodiment, some of those cells 64 in the battery case 50 which are located near the flank of the vehicle body are mounted so that the surface direction Z of the cell elements 66 is coincident with the vehicle width direction for the sake of mountability and the like. In this case, a part of the battery case 50 around these some cells 64 is configured to have high rigidity in the vehicle width direction. Thus, a collision-induced short circuit, short-circuit-induced heat generation, etc., can be retarded without reducing the mountability of the cells 64.

In the present embodiment as mentioned before, the electric vehicle comprises a pair of side members 31 and 32 arranged spaced from each other in the width direction of the vehicle body 11. The tray member 51 is fixed to the pair of side members 31 and 32 by a beam member 101, 102, 103 and 104 extending in the width direction of the vehicle body 11. The tray member 51 includes sidewalls 51c and 51d arranged along the side members 31 and 32. An upper end of each sidewall 51c and 51d of the tray member 51 is opposed to the side surface portion 64a between upper and lower ends of each corresponding cell 64 on the outer peripheral side. If a collision load is laterally applied to the vehicle body 11, according to this arrangement, the side surface portion 64a between the upper and lower ends of each cell 64 on the tray member 51 is pushed by the sidewall 51c and 51d of the tray member 51. When the cell 64 is pushed sideways, therefore, the upper and lower ends of the cell elements 66 in the cell 64 can be restrained from being collapsed. Although the electric vehicle that is provided with the traction motor in the rear part of the vehicle body has been described in connection with the foregoing embodiment, the present invention is also applicable to an electric vehicle in which the traction motor is located in the front part of the vehicle body and to a hybrid vehicle and the like that use some other drive means (e.g., internal combustion engine) than the traction motor for the purpose. Further, the cell may be some other secondary battery than the non-aqueous electrolyte battery, including the lithium-ion battery. For example, the cell may be an alkaline secondary battery, such as a nickel-hydride battery, and its shell member may be of any other suitable shape or material. It is to be understood, in carrying out the present invention, that the construction and arrangement of the components of the invention, including the motor, battery case, battery modules, and cells, may be embodied in suitably modified forms.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electric vehicle comprising a battery unit mounted in a vehicle body, comprising:

a pair of side members arranged spaced from each other in a width direction of the vehicle body, wherein the battery unit includes a battery case arranged between the side members and fixed to the vehicle body and a battery module composed of a plurality of battery cells contained in the battery case, the battery case includes a tray member, which supports the battery cells thereon, and a cover member fixed to the tray member so as to be superposed thereon, the tray member is fixed to the pair of side members by a beam member extending in the width direction of the vehicle body, each of sidewalls of the tray member has resin portions made of resin, the sidewalls are arranged along the side members, each of the battery cells includes sheet-like cell elements including a positive electrode and a negative electrode laminated within a shell member, at least those battery cells on an outer peripheral side which are located near a flank of the vehicle body, among all the battery cells contained in the battery case, are located on the tray member so that a lamination direction of the battery cell elements is coincident with the width direction of the vehicle body, the resin portions of each sidewall of the tray member are arranged between each side member and side surface portions of battery cells located on the outer peripheral side, an upper end of each sidewall is opposed to the side surface portion between upper and lower ends of each corresponding battery cell located on the outer peripheral side, and the side surface portion of the battery cell on the outer peripheral side is pressed by the side wall in the lamination direction when the side member is deformed toward the battery cells.

* * * * *